(12) United States Patent
Kim

(10) Patent No.: US 6,872,296 B2
(45) Date of Patent: Mar. 29, 2005

(54) METHOD FOR REMOVING AMMONIA FROM A GAS COMPRISING HYDROGEN CYANIDE, AMMONIA AND WATER

(75) Inventor: Tae Hoon Kim, Orange, TX (US)

(73) Assignee: INVISTA North America S.à.r.l., Wilmington, DE (US)

(*) Notice: Subject to any disclaimer, the term of this patent is extended or adjusted under 35 U.S.C. 154(b) by 198 days.

(21) Appl. No.: 10/209,258

(22) Filed: Jul. 30, 2002

(65) Prior Publication Data

US 2004/0022709 A1 Feb. 5, 2004

(51) Int. Cl.$^7$ .................................................. C01C 3/04
(52) U.S. Cl. ........................ 205/687; 423/236; 423/238
(58) Field of Search .......................... 205/687; 423/236, 423/238

(56) References Cited

U.S. PATENT DOCUMENTS

| | | | |
|---|---|---|---|
| 1,934,838 A | 11/1933 | Andrussow | |
| 2,899,274 A | 8/1959 | Smith | |
| 4,287,162 A | * 9/1981 | Scheibel | ............ 423/238 |

* cited by examiner

Primary Examiner—Arun S. Phasge

(57) ABSTRACT

A method for removing ammonia from a gas comprising HCN, ammonia and water, by first contacting the gas with aqueous ammonium phosphate to remove ammonia from the gas, and then passing the resulting ammonium phosphate solution through an electrolyzer to convert oxalates and formates into hydrogen and carbon dioxide.

1 Claim, 2 Drawing Sheets

METHOD FOR REMOVING AMMONIA FROM A GAS COMPRISING HYDROGEN CYANIDE, AMMONIA AND WATER

BACKGROUND OF THE INVENTION

Hydrocyanic acid (or "hydrogen cyandide") (HCN) can be commercially produced by reacting ammonia with natural gas (methane) and an oxygen-containing gas at an elevated temperature in a converter in the presence of a suitable catalyst (U.S. Pat. No. 1,934,838). The exit gas from the converter contains unreacted ammonia together with small amounts of oxalic acid and formic acid (or precursors of oxalic acid and formic acid). The unreacted ammonia is separated from HCN in an absorber by contacting the converter exit gas with an aqueous solution of ammonium phosphate in the ammonia absorber. The initial ammonium to phosphate molar ratio in the ammonium phosphate solution is in the range of 1 to 1.5, and this solution can be referred to as "lean ammonium phosphate solution." The oxalic acid and formic acid end up in the aqueous solution, where they are converted to oxalates and formates. After absorption, the final ammonium to phosphate molar ratio in the ammonium phosphate solution is in the range of 1.5 to 2.0, and this solution can be referred to as "rich ammonium phosphate solution." The rich ammonium phosphate solution is converted back to lean ammonium phosphate solution by stripping ammonia with water vapor in a distillation column (ammonia stripper). The lean ammonium phosphate solution thus obtained is reused in the ammonia absorber. The distillation operation in the ammonia stripper does not remove the oxalates and formates. As a result, there is accumulation of these compounds in the ammonium phosphate solution. Presence of the oxalate and the formate compounds can cause corrosion and failure of process equipment. A concentration of oxalate greater than 1% and a concentration of formate greater than 3% are undesirable. Therefore, a part of the ammonium phosphate solution must be continuously purged from the loop as waste. A waste treatment cost is associated with this purge. The process also requires addition of make-up ammonium phosphate solution, with an associated cost.

It is known that the freezing point of ammonium phosphate solution decreases with increases in its concentration. In the process described above, the ammonia absorber is operated at a temperature of about 55 degrees C. The presence of oxalates and formates in the lean ammonium phosphate solution help to raise the freezing point of the solution. However, even with oxalates and formates present, the upper limit on the concentration of ammonium phosphate solution used is about 35% in order to avoid freezing of ammonium phosphate solution and resulting equipment plugging caused by the frozen solution. If, however, oxalates and formates could be eliminated from the lean ammonium phosphate solution, the freezing point would be depressed, with the effect that higher concentrations of ammonium phosphate could be employed without the risk of freezing. Such higher concentrations of ammonium phosphate should result in greater process capacity.

It would be desirable, therefore, to have a process for making HCN in which oxalate and formate compounds are continuously decomposed, avoiding build up in the process with a need for substantial purges, and allowing for the use of higher lean ammonium phosphate concentrations with increased process capacity.

SUMMARY OF THE INVENTION

In the present invention, the oxalate and formate compounds present in the ammonium phosphate solution are continuously decomposed to carbon dioxide and hydrogen using electrochemical cells. The need for a continuous purge is, therefore, eliminated. Hence, the generation of waste is reduced and a saving on waste treatment cost may be achieved. The need for make-up ammonium phosphate solution is also reduced. A decrease in the concentration of formate and oxalate compounds should lead to a decrease in the freezing point of the ammonium phosphate solutions. This decrease should enable the use of increased concentrations of ammonium phosphate in the ammonium phosphate solutions, and hence an increase in the capacity of the process.

The present invention is, therefore, a method for removing ammonia from a gas comprising HCN, ammonia and water, comprising:

a. contacting the gas with a first aqueous ammonium phosphate solution having a first ammonium ion to phosphate ion molar ratio to produce a substantially ammonia-free HCN gas and a second aqueous ammonium phosphate solution having a second ammonium ion to phosphate ion molar ratio higher than the first ratio, said second aqueous ammonium phosphate solution comprising ammonium oxalate and ammonium formate;

b. distilling the second ammonium phosphate solution to produce ammonia gas and a third ammonium phosphate solution having a third ammonium ion to phosphate ion molar ratio less than the second ratio, said third aqueous ammonium phosphate solution comprising ammonium oxalate and ammonium formate;

c. cooling said third ammonium phosphate solution to produce a fourth ammonium phosphate solution;

d. passing said fourth ammonium phosphate solution between at least one pair of electrodes having a DC voltage across said at least one pair of electrodes, capable of generating a sufficient current to oxidize said oxalate and formate to produce an oxidation product comprising carbon dioxide and hydrogen and a fifth ammonium phosphate solution that is substantially free of oxalate and formate; and e. separating the oxidation product from the fifth ammonium phosphate solution.

BRIEF DESCRIPTION OF THE DRAWING

The drawing consists of two figures.

DETAILED DESCRIPTION OF THE INVENTION

Figure 1:
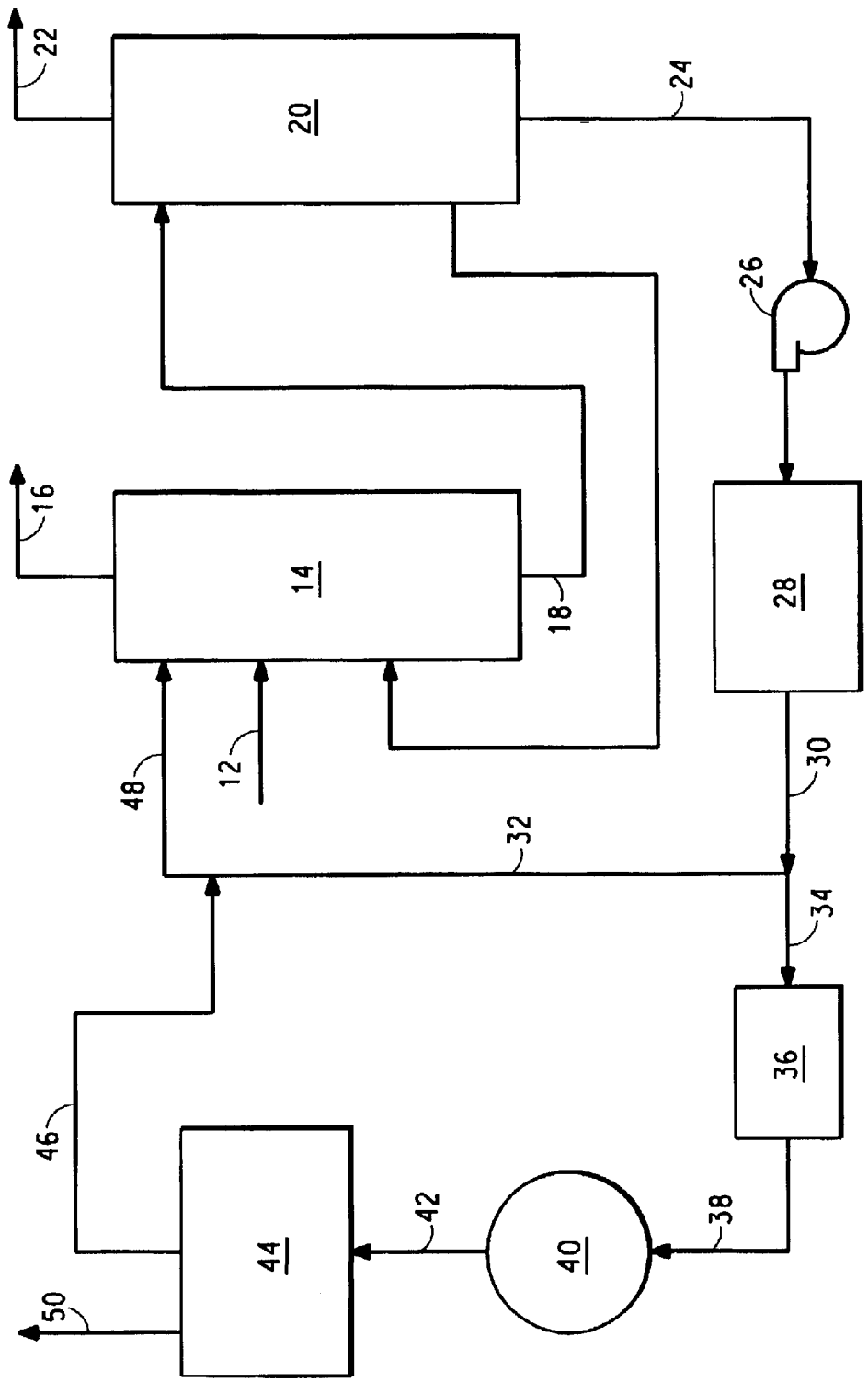
FIG. 1 depicts a block diagram of a process embodying the present invention.

Referring now to FIG. 1, there is shown a block diagram illustrating apparatus 10 that embodies the present invention.

An exit gas 12 from an HCN converter (not shown) is fed into an ammonia absorber 14 containing an ammonium phosphate solution having an initial ammonium ion to phosphate ion ratio (lean ammonium phosphate solution) (not shown). The ammonia absorber can be a packed column containing stainless steel packing material. The lean ammonium phosphate solution trickles down the packing where it comes in intimate contact with the converter exit gas and absorbs the ammonia contained in it. The packing provides good contact.

A stream of ammonia-free HCN gas 16 leaves the top of the ammonia absorber 14 for further processing or use. A stream 18 of ammonium phosphate solution with an ammonium ion to phosphate ion ratio higher than that of the lean ammonium phosphate solution (rich ammonium phosphate solution) exits the ammonia absorber and is fed into an ammonia stripper 20. The ammonia stripper can be a distillation column with multiple trays in it. Heat supplied through a reboiler section (not shown) of the distillation column generates water vapor that forces desorption of ammonia from the rich ammonium phosphate solution. Rich ammonium phosphate solution is converted back to lean ammonium phosphate solution by this action.

A stream 22 of ammonia and water vapor leaves the top of the ammonia stripper 20 for reuse. A stream 24 of lean ammonium phosphate solution flows through a pump 26 and is cooled through a cooler 28 to produce stream 30 of cooled lean ammonium phosphate solution. Stream 30 is divided into two parts: stream 32 and stream 34.

Stream 34 is further cooled in a cooler 36 to produce stream 38. Stream 38 is fed to a filter 40. The filter removes particulate contaminant from stream 38 to produce a substantially particulate-free stream 42 that is fed to an electrolyzer 44.

Figure 2:
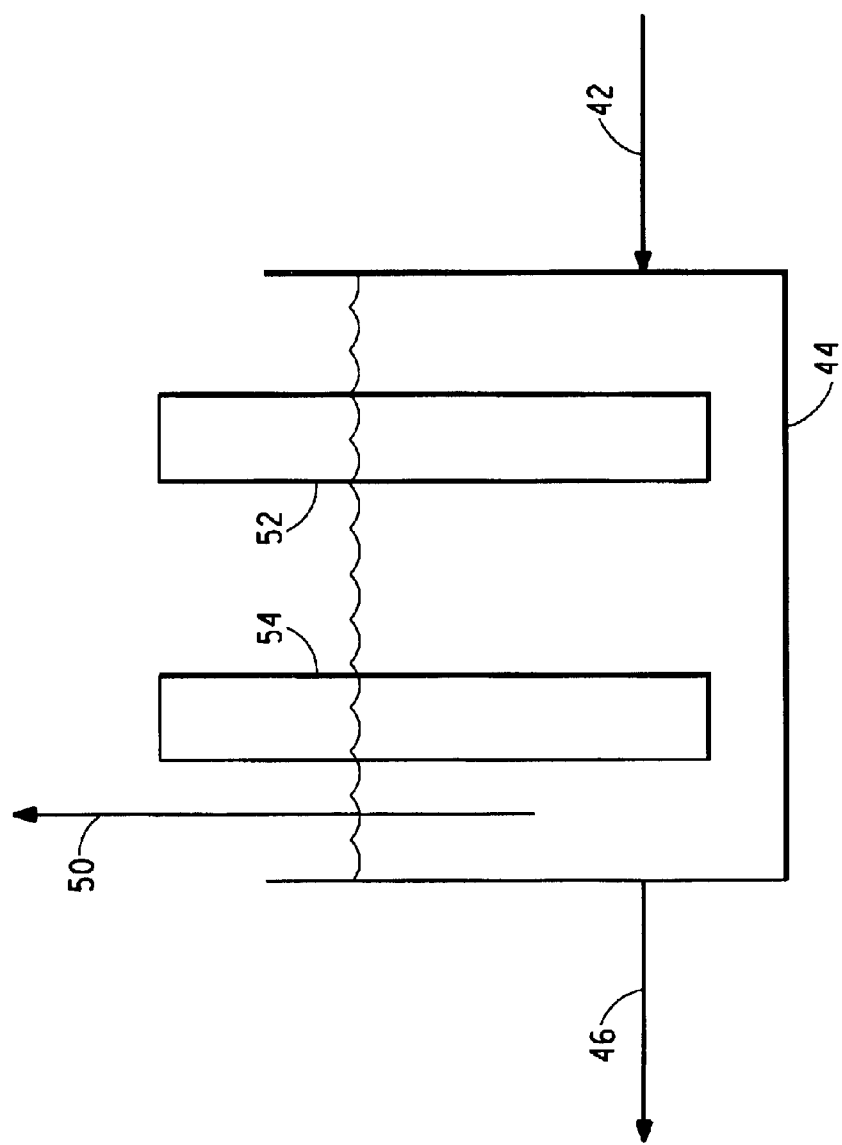
FIG. 2 depicts a schematic of an electrolyzer used in the invention.

Referring now to FIG. 2, there is shown a schematic of an electrolyzer 44 for use in the current invention. In the electrolyzer, a DC voltage of 3.5 to 4.0 volts is applied across one or more pairs of electrodes 52, 54 at about 7000 amps. The anode 52 of the electrolyzer preferably is a fine mesh of titanium wire, coated with iridium oxide. Electrical energy converts at least a portion of the formates and oxalates present in the filtered stream 42 to carbon dioxide and hydrogen, that leave the electrolyzer, along with some oxygen coming from the hydrolysis of water, as stream 50.

A stream 50 containing carbon dioxide and hydrogen leaves the electrolyzer as off-gas. The electrolyzer produces a substantially formate- and oxalate-free lean ammonium phosphate solution 46 that is combined with stream 32. A combined lean ammonium phosphate solution stream 48 is fed to the ammonia absorber 14. The temperature of stream 48 should be in the range of 50 to 60 degrees C. in order to achieve good absorption of ammonia.

What is claimed is:

1. A method for removing ammonia from a gas comprising HCN, ammonia and water, comprising:
    a. contacting the gas with a first aqueous ammonium phosphate solution having a first ammonium ion to phosphate ion molar ratio to produce a substantially ammonia-free HCN gas and a second aqueous ammonium phosphate solution having a second ammonium ion to phosphate ion molar ratio higher than the first ratio, said second aqueous ammonium phosphate solution comprising ammonium oxalate and ammonium formate;
    b. distilling the second ammonium phosphate solution to produce ammonia gas and a third ammonium phosphate solution having a third ammonium ion to phosphate ion molar ratio less than the second ratio, said third aqueous ammonium phosphate solution comprising ammonium oxalate and ammonium formate;
    c. cooling said third ammonium phosphate solution to produce a fourth ammonium phosphate solution;
    d. passing said fourth ammonium phosphate solution between at least one pair of electrodes having a DC voltage across said at least one pair of electrodes, capable of generating a sufficient current to oxidize said oxalate and formate to produce an oxidation product comprising carbon dioxide and hydrogen and a fifth ammonium phosphate solution that is substantially free of oxalate and formate; and
    e. separating the oxidation product from the fifth ammonium phosphate solution.

* * * * *